United States Patent [19]

Gläser

[11] Patent Number: 4,681,331
[45] Date of Patent: Jul. 21, 1987

[54] PERAMBULATOR

[75] Inventor: Dieter Gläser, Dachau, Fed. Rep. of Germany

[73] Assignee: Peg Perego Pines S.p.A., Milan, Italy

[21] Appl. No.: 658,794

[22] Filed: Oct. 9, 1984

[51] Int. Cl.⁴ .............................................. B62B 7/06
[52] U.S. Cl. .................................. 280/47.36; 16/112; 280/47.38
[58] Field of Search .......... 280/47.38, 47.36, 47.37 R, 280/47.29, 642, 644, 648, 649, 650; 16/111 A, 112, 126, 333, 327, 343, 345

[56] References Cited

U.S. PATENT DOCUMENTS 2,791,437  5/1957  Knarzer ........................... 280/47.36
3,246,909  4/1966  Siwek ............................ 280/47.37 R

FOREIGN PATENT DOCUMENTS 1320941  2/1963  France ................................. 16/333
432762   3/1948  Italy ................................. 280/47.36
199675   9/1923  United Kingdom .................. 280/47

Primary Examiner—John J. Love
Assistant Examiner—Michael Mar
Attorney, Agent, or Firm—Arnold, White & Durkee

[57] ABSTRACT

The invention relates to a perambulator comprising a frame and a push bar assembly pivotally connected to both sides of the frame for pivotal movement between a forward position and a rearward position. In a known perambulator of the type defined above, pivoting of the push bar assembly requires manual operation of a number of catch hooks, thus involving a considerable risk of faulty operation and consequent injury. In contrast thereto, the perambulator according to the invention is provided with two stop members on each side of the frame for limiting the pivoting movement of the push bar assembly, and a manually operable locking member disposed at an intermediate position therebetween for preventing the push bar assembly from being pivoted from one position to the other in its rest position.

6 Claims, 4 Drawing Figures

PERAMBULATOR

DESCRIPTION

The invention relates to a perambulator having a frame and a push bar assembly pivotally connected to the frame on both sides thereof and adapted to be locked at a forward position and a rearward position.

From practical use there is already known a perambulator of the type defined above, in which the pivotally mounted push bar assembly is adapted to be locked in each of its end positions by manually operable hooks pivotally mounted on both sides of the frame. The hooks are engageable with bolts secured to the push bar assembly at lateral positions. This construction of the push bar assembly requires a number of manual operations to be carried out by the user for pivoting the push bar assembly between its forward and rearward positions. There is thus a corresponding number of possibilities that the push bar assembly is not properly and safely locked at its end position due to faulty operation. There is also the danger of the hooks becoming disengaged from the bolts during use of the perambulator, with the result of considerable risk of accidetns being incurred.

It is an object of the present invention to provide a perambulator of the type set forth in the introduction, which is of simple construction and operation, and which is adjustable to different riding positions for travel in opposite directions by simply pivoting the push bar assembly between two end positions without requiring additional complicated manipulations to this purpose.

In order to attain this object, the invention provides that two stop members for limiting the pivotal movement of the push bar assembly are provided on each said of the frame, a manually operable locking element adapted in its rest position to prevent the push bar assembly from being moved from one position to the other being disposed at an intermediate location.

The perambulator according to the invention offers considerable advantages over prior art. The pivotal movement of the push bar assembly is limited at the end positions by simple stop members, so that the user does not have to lock the push bar assambly in its end positions. Any accidental pivoting of the push bar assembly from one end position to the other is positively precluded by a locking member disposed between the limiting stop members so as to prevent in its rest position the push bar assembly from being pivoted in a reliable manner and without the intervention of the user. The danger of the push bar assembly being released from its respective end positions during use of the perambulator is thus positively excluded.

In an advantageous embodiment of the perambulator, the invention provides that the locking element is adapted to be displaced transversely of the pivoting plane of the push bar assembly for the release thereof. As a result of this provision, the locking element positively and reliably prevents the push bar assembly from being pivoted under the action of forces transmitted therethrough to the frame of the perambulator during use thereof.

According to a further advantageous aspect of the invention, the locking element is secured to a center portion of a guide rod connecting the stop members to one another, so that its end portions project into the pivoting path of the push bar assembly. This construction ensures a particularly reliable guidance of the push bar assembly while improving the stability of the stop members and reducing the danger of injuries by exposed corners and edges. The centered mounting of the locking element favours an extremely lightweight and compact construction of the perambulator.

In another preferred embodiment of the perambulator according to the invention, the locking element comprises a plate-shaped member pivotally connected to the frame intermediate the stop members and biased by a spring to its rest position perpendicular to the pivoting plane of the push bar assembly. This construction is particularly simple and space-saving. The number of components is reduced to a minimum, and the danger of faulty handling by an unskilled user is practically eliminated.

In another advantageous embodiment of the perambulator according to the invention, the locking element is of U-shaped cross-sectional configuration straddling the guide rod. This construction reliably eliminates the danger of a child occupying the perambulator getting its fingers caught in the mechanism with the resultant injury as the push bar assembly is pivoted from one end position to the other.

Preferred embodiments of the invention showing further characteristics and advantages thereof shall now be described by way of example with reference to the accompanying drawings, wherein.

Figure 1:
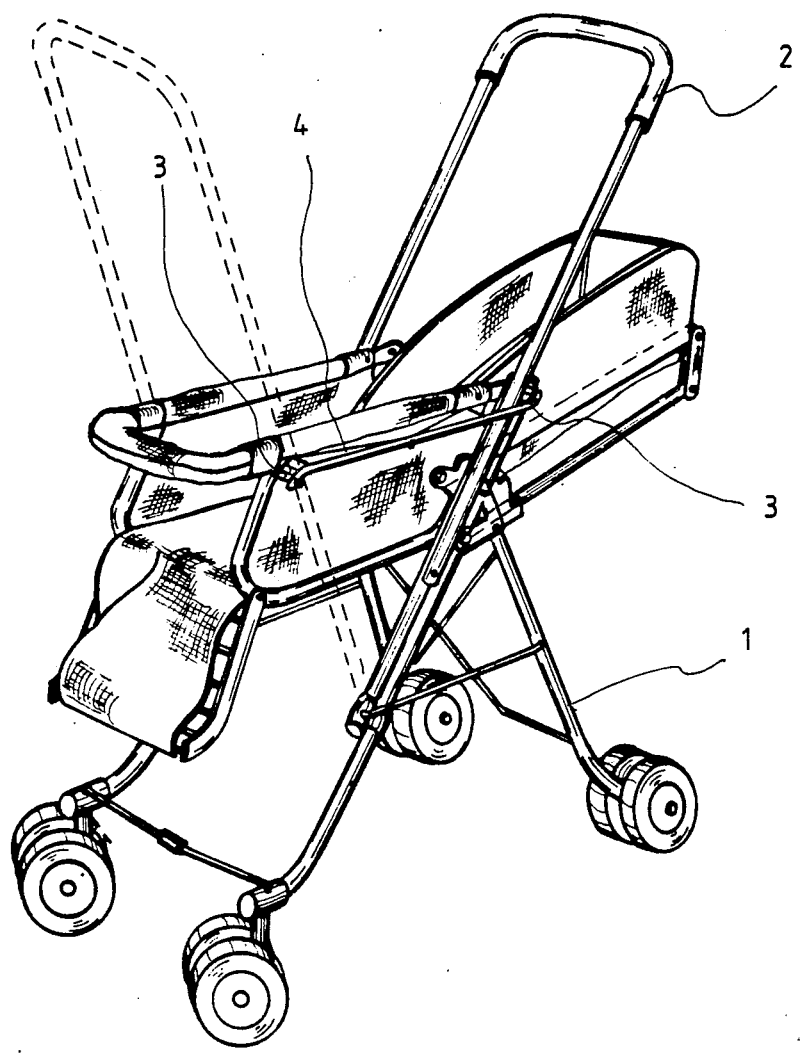
FIG. 1 shows a perspective view of a perambulator

A perambulator shown in FIG. 1 comprises a frame 1 having a push bar assembly 2 pivotally connected to both sides thereof. Push bar assembly 2 is mounted for pivotal movement between a forward and a rearward position. This pivotal movement of the push par assembly is limited by stop members 3 provided on both sides of frame 1. A locking element 4 is disposed intermediate of stop members 3.

Figure 2:
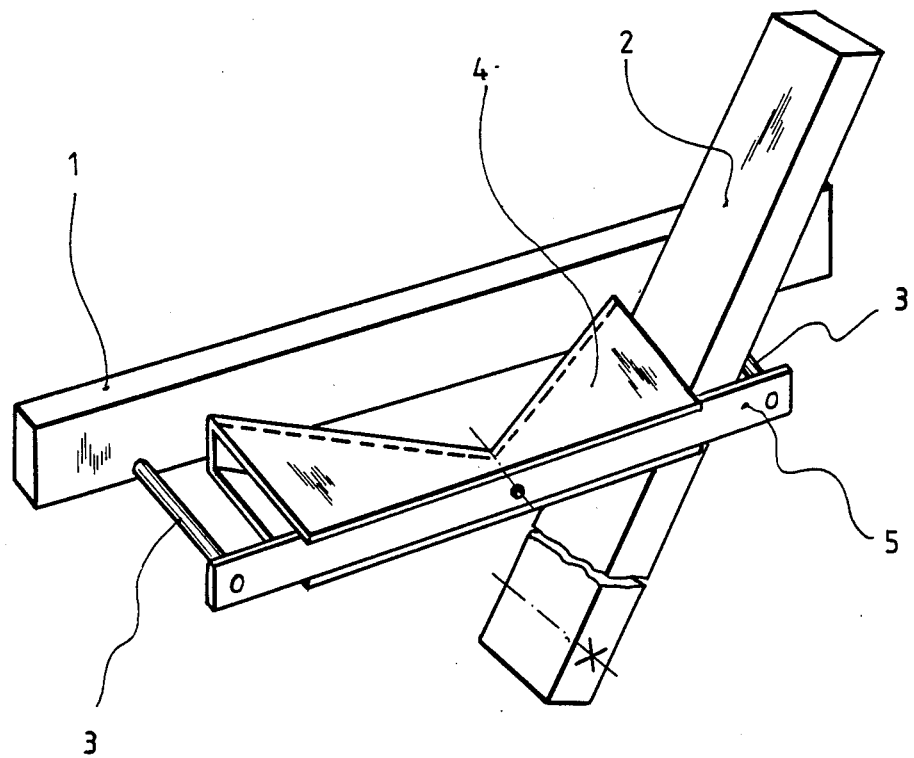
FIG. 2 shows a perspective view of a first embodiment of a locking element.

Shown in FIG. 2 is a perspective view of a first embodiment of locking element 4. Two stop members 3 secured to frame 1 are interconnected by a guide rod 5. Locking element 4 is secured to guide rod 5 at a center location thereof. Locking element 4 is of symmetrical design and has a U-shaped cross-sectional configuration. The legs of this U-section are dimensioned so as to straddle guide rod 5. In a top plan view of locking element 4, the two end portions thereof are of substantially triangular shape. The end portion of locking element 4 facing towards push bar assembly 2 may be laterally displaced for releasing the push bar assembly, so that the latter can be pivoted to its other end position. As soon as push bar assembly has arrived at the center of locking element 4, it starts to ride up on the other end portion thereof to cam it out of its pivoting path. As soon as push bar assembly engages the respective stop member 3, the end portion of locking bar 4 snaps back to its rest position in which it prevents push bar assembly 2 from being pivoted back to its first position.

Figure 3:
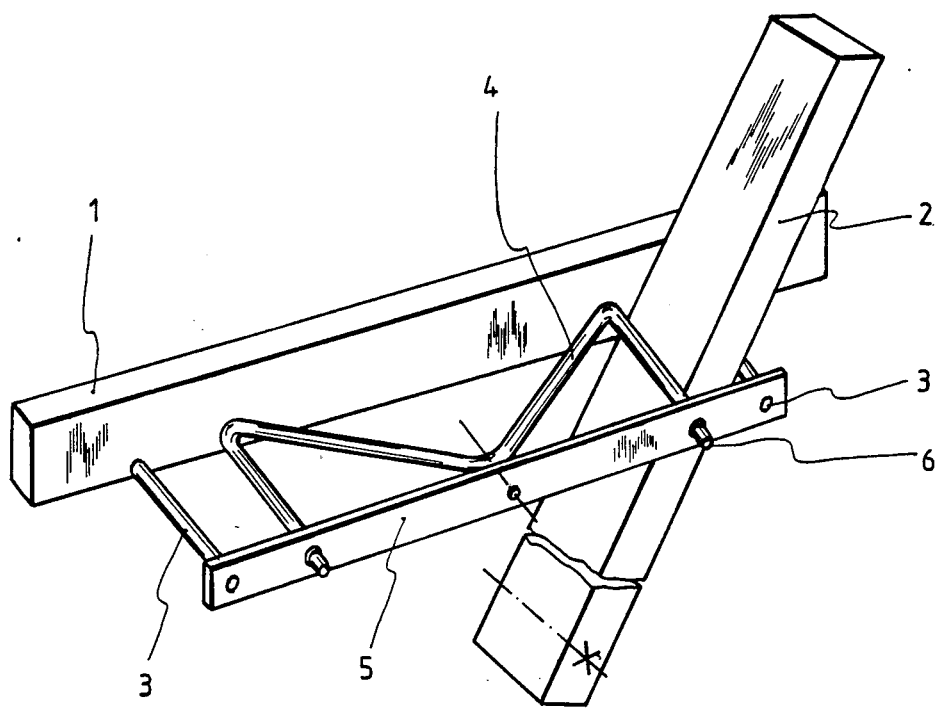
FIG. 3 shows a perspective view of a second embodiment of the locking element.

FIG. 3 shows a second embodiment of the locking element 4 according to the invention. Two stop members 3 are again secured to frame 1 for limiting the pivotal movement of push bar assembly 2. The two stop members 3 are interconnected by a guide rod 5. Secured to the center portion of guide rod 5 is a locking element 4 having a wire-like cross-sectional shape, the end portions of locking element 4 being angularly bent to a substantially triangular configuration as seen in a top plan view. The ends of locking element 4 extend through openings 6 formed in guide rod 5. In its rest position locking element 4 prevents push bar assembly 2 from being pivoted. Depressing the end portion of locking element 4 facing towards push bar assembly 2 results in the latter being released for pivotal movement. During such depression, the end of locking element 4 is guided in the respective opening 6 of guide rod 5. After push bar assembly 2 has been pivoted to its other position, locking element 4 returns to its rest position so as to lock push bar assembly 2 in position.

Figure 4:
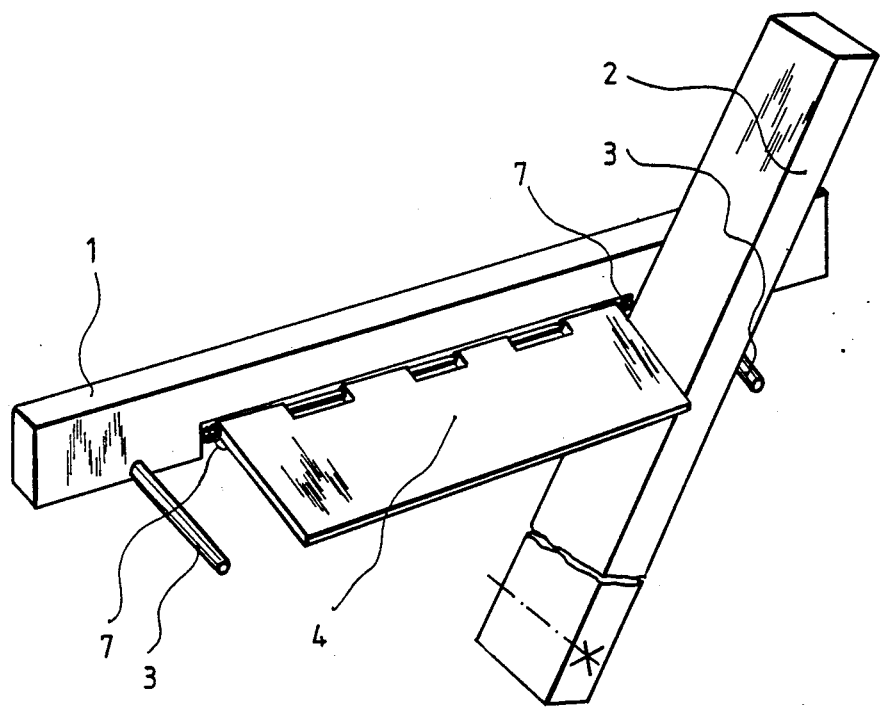
FIG. 4 shows a perspective view of a third embodiment of the locking element.

A third embodiment of the locking element according to the invention shown in FIG. 4 comprises a pair of stop members 3 secured to frame 1. The locking element 4 disposed intermediate of the two stop members 3 comprises a plate-shaped member pivotally connected to frame 1 with its longer side. At least one spring 7 is provided for biasing plate-shaped locking element 4 to its rest position perpendicular to the pivoting plane of push bar assembly 2. Push bar assembly 2 may be released from its locked position by pivoting plate-shaped locking element 4 downwards against the action of spring 7. As soon as push bar assembly has then reached a position adjacent the opposite stop member 3, spring 7 causes locking element 4 to return to its rest position.

The invention is not restricted to the embodiments shown and described by way of example. Numerous other configurations of the locking element 4 as well as a wide selection of materials to be employed for the locking element are conceivable within the scope of the invention. It is also possible to provide a push bar assembly of two-piece construction and/or to vary the mounting location of the push bar assembly and/or of the stop members 3 on the frame 1 in any suitable manner.

I claim:

1. A baby carriage comprising:
   a frame;
   a seat coupled to the frame adapted to receive a child;
   a push bar assembly pivotally connected to both sides of said frame and adapted to be locked at a forward position and a rearward position;
   two stop members (3) for limiting the pivotal movement of said push bar assembly provided on each side of same frame (1); and
   a manually operable elongated locking element (4) adapted in its rest position to prevent said push bar assembly from being pivoted from one position to the other and longitudinally interposed at an intermediate location between said two positions,
   said locking element (4) being coupled to a center portion of a guide rod (5) connecting said stop members (3) and having end portions projecting into the pivoting path of said push bar assembly (2),
   said locking element (4) being of U shaped configuration between said end portions
   each of said end portions of said locking element (4) being adapted to be alternately displaced transversely towards said guide rod (5) for the release of said push bar assembly (2).

2. A baby carriage according to claim 1, characterized in that said locking element (4) is formed of a synthetic resin.

3. A baby carriage according to claim 1, characterized in that said locking element (4) is formed of metal.

4. A baby carriage comprising:
   a frame;
   a seat coupled to the frame adapted to receive a child;
   a push bar assembly pivotally connected to both sides of said frame and adapted to be locked at a forward position and a rearward position;
   two stop members (3) for limiting the pivotal movement of said push bar assembly provided on each side of said frame (1);
   a guide rod (5) connecting said two stop members (3); and
   a manually operable elongated locking element (4) coupled to said guide rod (5) and adapted in its rest position to prevent said push bar assembly from being pivoted from one position to the other and longitudinally interposed at an intermediate location between said two positions,
   said locking element (4) having a wire-like cross-sectional shape and being formed with angularly bent end portions the free ends of which project through openings (6) formed in said guide rod (5).

5. A baby carriage comprising:
   a support frame;
   a seat connected to the framed adapted to support an infant;
   an elongated push bar coupled to the frame for pivotal movement on a path of travel between a first and second position; and
   means connected to the frame for releaseably locking said push bar in either said first or second positions including,
   an elongated locking element normally disposed in said path of travel between said first or second positions,
   said locking element having a pair of spaced-apart end portions for alternately engaging said push bar in said first or second position,
   said locking element being shiftable from said path of travel to permit pivotal movement of the push bar from one position to the other position,
   said locking element having a central connection joining a pair of generally triangularly-shaped, push-bar-engageable, legs,
   the locking element being transversely shiftable relative to said push bar to permit pivotal movement of said push bar.

6. A baby carriage in accordance with claim 5, the locking element being configured for transverse shifting of the leg adjacent said push bar to permit pivotal movement of the push bar along said path of travel to a location adjacent said central connection, further pivotal movement of said push bar cammingly engaging the locking element to cause transverse shifting thereof.

* * * * *